US007874394B2

(12) United States Patent
Cajan et al.

(10) Patent No.: US 7,874,394 B2
(45) Date of Patent: Jan. 25, 2011

(54) INDUSTRIAL TRUCK WITH A PREASSEMBLED AXLE ASSEMBLY

(75) Inventors: Boris Cajan, Darmstadt (DE); Mark Hanke, Leidersbach (DE); Ulrich Kriegsmann, Aschaffenburg (DE); Udo Herrmann, Johannesburg (DE)

(73) Assignee: Linde Material Handling GmbH, Aschaffenburg (DE)

( * ) Notice: Subject to any disclaimer, the term of this patent is extended or adjusted under 35 U.S.C. 154(b) by 49 days.

(21) Appl. No.: 11/939,139

(22) Filed: Nov. 13, 2007

(65) Prior Publication Data

US 2008/0142306 A1 Jun. 19, 2008

(30) Foreign Application Priority Data

Nov. 15, 2006 (DE) ....................... 10 2006 053 779
Jan. 12, 2007 (DE) ....................... 10 2007 001 860

(51) Int. Cl.
*B60K 1/00* (2006.01)

(52) U.S. Cl. ....................................... 180/299; 180/312

(58) Field of Classification Search ................. 180/295, 180/299, 312, 228, 300, 305, 307
See application file for complete search history.

(56) References Cited

U.S. PATENT DOCUMENTS 4,449,606 A * 5/1984 Buschbom et al. .......... 180/297
4,506,757 A * 3/1985 Matsumoto et al. ......... 180/294
5,460,234 A * 10/1995 Matsuura et al. ........... 180/65.1
5,941,327 A * 8/1999 Wu ........................... 180/65.1
6,056,077 A * 5/2000 Kobayashi .................. 180/216
6,155,373 A * 12/2000 Kajino ....................... 180/299
6,250,410 B1 * 6/2001 Balestrini et al. ........ 180/65.51
6,273,208 B1 * 8/2001 Sand .......................... 180/299
6,336,517 B1 * 1/2002 Cheng ......................... 180/208
6,338,393 B1 * 1/2002 Martin ....................... 180/227
6,439,331 B1 * 8/2002 Fan ............................ 180/208
6,581,713 B2 * 6/2003 Fu et al. ..................... 180/291
6,644,910 B2 11/2003 Gotz
6,655,717 B1 * 12/2003 Wang ......................... 280/781
6,896,084 B2 * 5/2005 Lo ............................. 180/208
6,994,178 B2 * 2/2006 Mizuno ....................... 429/13
7,083,018 B2 * 8/2006 Luh ........................... 180/65.1
2002/0092687 A1 7/2002 Forster

FOREIGN PATENT DOCUMENTS

DE 10063167 A1 6/2002
EP 1215164 A1 6/2002

* cited by examiner

*Primary Examiner*—Jeffrey J Restifo
(74) *Attorney, Agent, or Firm*—The Webb Law Firm

(57) ABSTRACT

An industrial truck, in particular counterbalance fork-lift truck, has a front drive axle (2) which has at least one electric drive motor and is fastened together with other components (K) to a vehicle frame (1). A component carrier (T) adjoining the drive axle (2) at the rear in the longitudinal direction of the vehicle is rigidly connected to the drive axle (2) and at least one vibration-producing and/or vibration-transmitting component (K) is fastened on the component carrier (T). The drive axle (2) with the component carrier (T) and the components (K) fastened thereon form a preassembled axle assembly, which is elastically mounted on the vehicle frame (1).

3 Claims, 2 Drawing Sheets

INDUSTRIAL TRUCK WITH A PREASSEMBLED AXLE ASSEMBLY

CROSS REFERENCE TO RELATED APPLICATIONS

This application claims priority to German Application No. 10 2006 053 779.3 filed Nov. 15, 2006 and German Application No. 10 2007 001 860.8 filed Jan. 12, 2007, both of which applications are herein incorporated by reference in their entirety.

BACKGROUND OF THE INVENTION

1. Field of the Invention

The invention relates to an industrial truck, in particular a counterbalance fork-lift truck, with a front drive axle having at least one electric drive motor and in which the front drive axle is fastened together with other components to a vehicle frame.

2. Technical Considerations

A generic industrial truck is known from DE 100 63 167 A1. In this industrial truck, the pump motor of the working hydraulics is integrated into the drive axle or fastened thereto (flange-mounted). Furthermore, the power control systems of the pump motor and the electric drive motor, as well as a control valve block of the working hydraulics, may be integrated into the drive axle or fastened thereto. In order to be able to integrate these components into the drive axle of the generic industrial truck or fasten them thereto, the drive axle has to be configured accordingly, i.e., consideration has to be given to accommodating such components in or on the drive axle with regard to the space requirement and fastening possibilities and this means a relatively high outlay.

In the case of other known industrial trucks, these components are arranged distributed on the vehicle. The outlay for assembly is relatively high here. Furthermore, a considerable outlay is produced for vibration damping. In particular, the components of the working hydraulics frequently have a vibration-producing and/or vibration-transmitting effect. In this case, the lifting unit of the working hydraulics, having an electric pump motor and a flange-mounted hydraulic pump, is a vibration-producing component. The control valve block required to control the lifting and tilting cylinders and, optionally, a side slide and further attached apparatuses, transmit vibrations owing to body noise. So that the vibrations also becoming apparent as a noise do not reach the driver's workplace, these components are elastically fastened to the vehicle frame, which requires a corresponding effort for decoupling. If vibration-producing and/or vibration-transmitting components are integrated directly into the drive axle of the industrial truck known from the generic document or are fastened thereto, there is a risk of increasing the vibrations (resonance) if decoupling elements are not interposed.

It is all object of the present invention to provide an industrial truck of the general type mentioned at the outset with a reduced outlay for production, the construction of which is simplified and in which the relaying of body noise from vibration-producing and/or vibration-transmitting components to the driver's workplace is reduced.

SUMMARY OF THE INVENTION

This object is achieved according to the invention in that a component carrier adjoining the drive axle in the longitudinal direction of the vehicle at the rear is rigidly connected to the drive axle and at least one vibration-producing and/or vibration-transmitting component is fastened on the component carrier. The drive axle forming, with the component carrier and the components fastened thereon, a preassembled axle assembly, which is elastically mounted on the vehicle frame.

Aspects of the invention accordingly include forming an assembly which includes the drive axle and the component carrier together with components fastened thereon and is preassembled, and mounting it, as a whole, elastically on the vehicle frame. In other words, to decouple it with regard to vibration transmission. Consequently, the structure of the industrial truck is simplified and the use of material, the outlay for work during assembly and therefore also the costs are reduced. The axle assembly designed as a preassembled unit is fastened as a whole to the vehicle frame, so the assembly time of the industrial truck according to the invention is reduced. At the same time, vibration-producing and/or vibration-transmitting components, together with the drive axle, are decoupled from the vehicle frame in terms of vibration.

According to an advantageous development of the invention, the axle assembly has two bearing elements spaced apart from one another in the transverse direction of the vehicle and arranged on the drive axle, as well as at least one further bearing element spaced apart in the longitudinal direction of the vehicle from the two bearing elements and center line of the axle and arranged at the end of the component carrier remote from the axle.

Thus, a statically determined three-point bearing arrangement of the axle assembly is provided which allows simple and effective vibration decoupling from the vehicle frame.

A power control system of the drive motor, an electric pump motor of the working hydraulics, a power control system of the pump motor, a hydraulic pump driven by the pump motor and/or a control valve block of the working hydraulics are expediently fastened to the component carrier.

BRIEF DESCRIPTION OF THE DRAWING

Further advantages and details of the invention are described in more detail with the aid of the embodiment shown in the schematic figures, in which.

DESCRIPTION OF THE PREFERRED EMBODIMENT

All industrial truck according to the invention, which is preferably configured as a front seat counterbalance fork-lift truck, has a vehicle frame 1, on the front region of which a drive axle 2 shown in the figures is fastened.

The drive axle 2 is tubular in principle. Respective electric wheel motors, not shown, are fastened to the tube ends. As an alternative to this, a single electric drive motor may be arranged inside the drive axle 2, downstream from which a differential gear is connected.

A component carrier T adjoins the rear of the drive axle 2 in the longitudinal direction of the vehicle and is rigidly connected to the drive axle 2 (for example, by a screw connection). Components K are fastened to the component carrier T, of which at least one component is vibration-producing and/or vibration-transmitting. The drive axle 2, together with the component carrier T and the components K fastened thereon, forms a preassembled axle assembly which, after preassembly, is elastically mounted, as a whole, to the vehicle frame 1. The component carrier T and the components K fastened thereon enter into a free space provided for this in the vehicle frame 1 of the industrial truck according to the invention.

The vibration-producing and vibration-transmitting components can include, in particular, components of the so-called working hydraulics, namely, the lifting unit having an electric pump motor and a pump driven thereby and the control valve block for controlling the lifting and tilting cylinders and any additional hydraulic consumers. In the industrial trucks of the prior art, these components are always elastically mounted independently, in each case, on the vehicle frame, i.e., elastically fastened or decoupled.

The type or mode of construction of the elastic bearing arrangement of the axle assembly on the vehicle frame 1 also emerges from the figures. The axle assembly is mounted by means of elastic bearing elements 6, 7 in the form of a statically determined three-point bearing arrangement on the vehicle frame 1 and therefore decoupled therefrom in terms of vibration.

Figure 1:
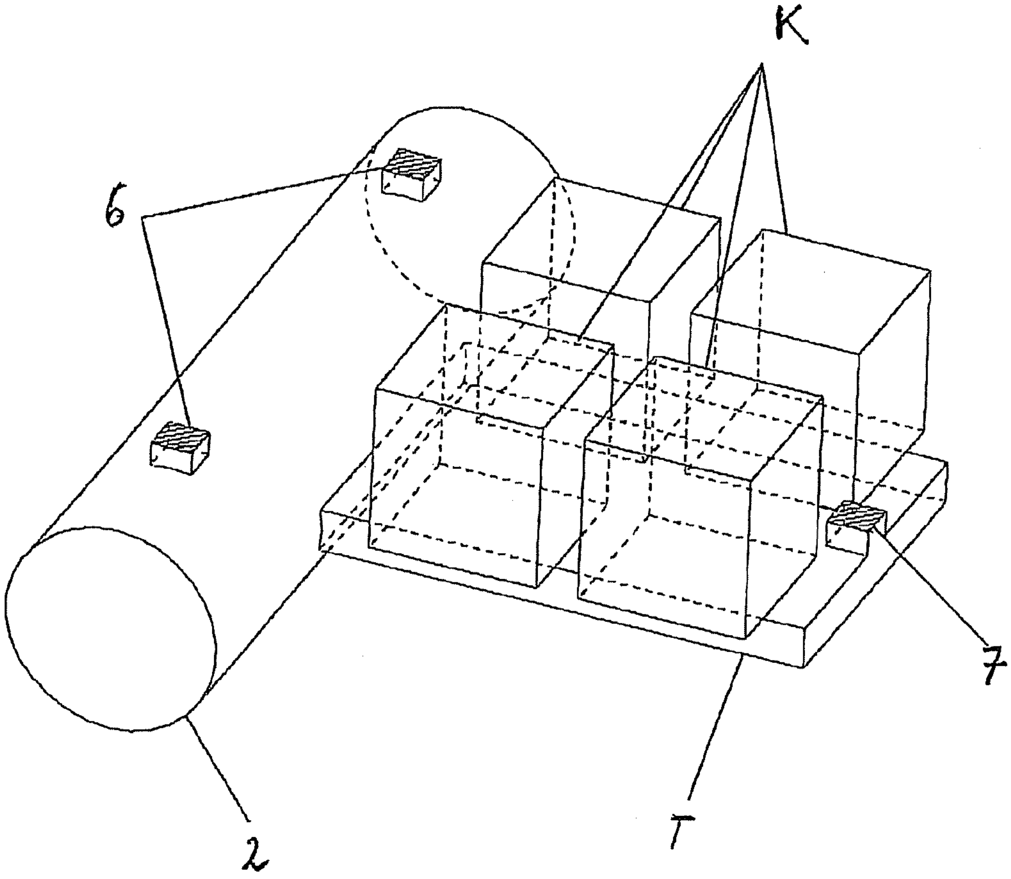
FIG. 1 shows a perspective view of the principle of a preassembled axle assembly of an industrial truck according to the invention.
Figure 2:
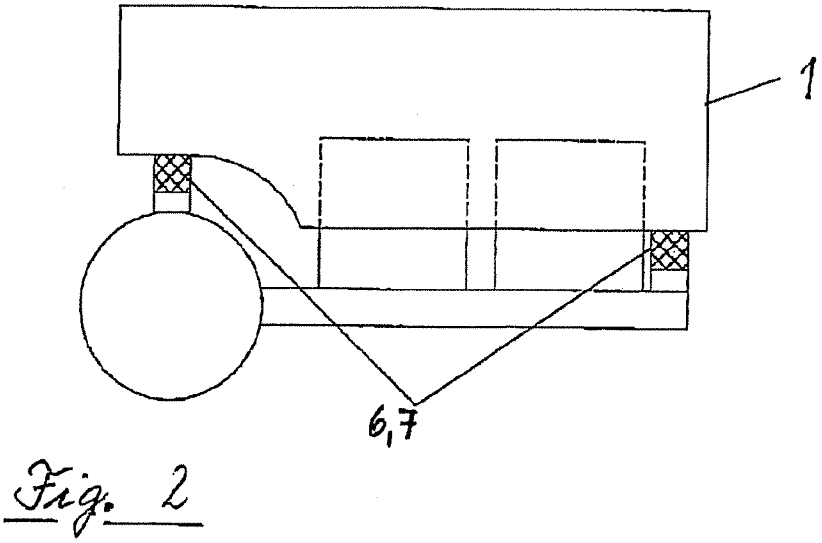
FIG. 2 shows a side view of the axle assembly according to FIG. 1 in the installed state.
Figure 3:
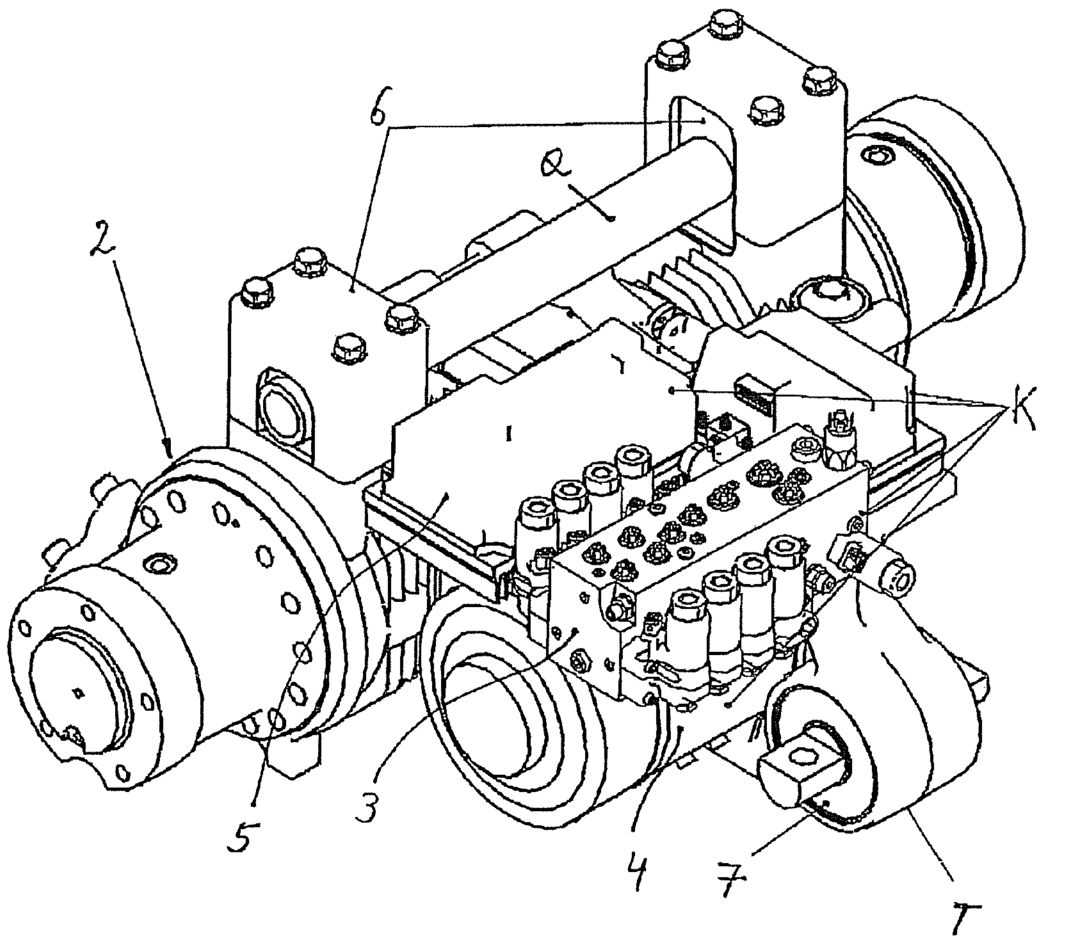
FIG. 3 shows a perspective view of a completed axle group.

An implemented embodiment of the axle assembly is shown in FIG. 3. Two bearing elements 6 (rubber/metal bearings) spaced apart from one another laterally are fastened on the drive axle 2 and are configured for receiving vertical forces and lateral horizontal forces. These front bearing elements 6 (in relation to the longitudinal direction of the vehicle) are in operative connection with a crossbar Q, which is part of the vehicle frame 1 or is rigidly connected thereon (not shown). The bearing elements 6 have a defined or selected elasticity and are preferably arranged vertically above the axial center line.

At the rear end (remote from the axle) of the component carrier T adjoining the drive axle 2 in the longitudinal direction of the vehicle at the rear, a further bearing element 7 is arranged, which is configured to receive the drive and braking torques and the horizontal forces in the longitudinal direction of the vehicle. This may, as shown, be an annularly formed rubber/metal element, which also has a defined or selected elasticity.

The two front similar bearing elements 6 and the rear bearing element 7 form the already mentioned, statically determined three-point bearing arrangement, by means of which a decoupling of the drive axle 2 and the components K fastened on the component carrier T preventing the transmission of vibrations or at least damping them, takes place.

Owing to this decoupling brought about by means of three bearing points of the axle assembly including the drive axle 2 and the component carrier T, it is moreover possible to design the suspension and damping properties of the front and rear bearing elements 6, 7 specifically for various types of forces and vibrations. Thus, the front bearing elements 6 primarily receiving vertical wheel forces may be configured so as to be relatively soft, while the rear bearing element 7 configured for torque support and the absorbing of horizontal forces in the longitudinal direction of the vehicle may be relatively stiff compared to the front bearing elements.

Located on the component carrier T in the embodiment shown in FIG. 3 as the components K are a control valve block 3 and a lifting unit of the working hydraulics, h includes an electric pump motor 4 and a hydraulic pump driven thereby. However, it is also possible in addition to the vibration-producing and/or vibration-transmitting components, to arrange other components on the component carrier T, such as, for example, the electronic power control system 5 of the pump motor 4 and/or of the drive motors arranged in the drive axle 2.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:

a tubular front drive axle having at least one electric drive motor and elastically mounted to a vehicle frame, wherein the drive axle includes two front bearing elements mounted on the drive axle and spaced apart from one another in a transverse direction of the vehicle;

a crossbar connected to and extending between the two front bearing elements;

a component carrier rigidly connected to a rear of the drive axle in a longitudinal direction of the vehicle and extending rearwardly therefrom;

a single rear bearing element connected to a rear of the component carrier and spaced apart in the longitudinal direction of the vehicle from the two front bearing elements; and at least one vibration-producing or vibration-transmitting component fastened to the component carrier such that the vibration-producing or vibration-transmitting component is located to the rear of the drive axle, wherein the drive axle with the component carrier and the components fastened thereon is a preassembled axle assembly.

2. An industrial truck according to claim 1, wherein at least one of a power control system of the drive motor, an electric pump motor of the working hydraulics, a power control system of the pump motor, a hydraulic pump driven by the pump motor, and a control valve block of the working hydraulics is fastened on the component carrier.

3. The industrial truck of claim 1, wherein the single rear bearing element on the component carrier is stiffer than the two front bearing elements on the drive axle.

* * * * *